United States Patent
Everwyn et al.

(10) Patent No.: US 10,400,623 B2
(45) Date of Patent: Sep. 3, 2019

(54) METHOD FOR DETECTING A FLUID LEAK IN A TURBOMACHINE AND SYSTEM FOR DISTRIBUTING A FLUID

(71) Applicant: SAFRAN AIRCRAFT ENGINES, Paris (FR)

(72) Inventors: Alexandre Patrick Jacques Roger Everwyn, Viry Chatillon (FR); Arnaud Rodhain, Maisons Alfort (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 733 days.

(21) Appl. No.: 14/714,551

(22) Filed: May 18, 2015

(65) Prior Publication Data
US 2015/0337679 A1 Nov. 26, 2015

(30) Foreign Application Priority Data

May 20, 2014 (FR) .................................. 14 54516

(51) Int. Cl.
*F01D 21/00* (2006.01)
*F01D 21/12* (2006.01)
(Continued)

(52) U.S. Cl.
CPC ......... *F01D 21/003* (2013.01); *F01D 17/085* (2013.01); *F01D 21/12* (2013.01);
(Continued)

(58) Field of Classification Search
CPC ........ F01D 21/00; G01M 3/002; B60L 11/00; G01R 31/00; G01R 19/00; H02H 3/00;
(Continued)

(56) References Cited

U.S. PATENT DOCUMENTS 3,059,660 A * 10/1962 Dantowitz .............. F01D 17/26
137/488
3,107,489 A * 10/1963 Palfreyman ............. F02C 7/277
60/39.093

(Continued)

FOREIGN PATENT DOCUMENTS

| EP | 2 369 318 A2 | 9/2011 |
| FR | 2 972 485 A1 | 9/2012 |
| FR | 2 987 398 A1 | 8/2013 |

OTHER PUBLICATIONS

French Preliminary Search Report dated Feb. 11, 2015 in French Application 14 54516, filed on May 20, 2014 (with English Translation of Categories of Cited Documents).

*Primary Examiner* — Lisa M Caputo
*Assistant Examiner* — Tran M. Tran
(74) *Attorney, Agent, or Firm* — Oblon, McClelland, Maier & Neustadt, L.L.P.

(57) ABSTRACT

A system and method for detecting a fluid leak in a turbomachine. The turbomachine includes a high temperature fluid source, at least one fluid distribution pipe adapted to distribute the fluid to different parts of the turbomachine and/or an aircraft which is to be equipped with the turbomachine, a turbomachine compartment in which the distribution pipe is at least partly accommodated, the compartment having in operation a low temperature relative to the high temperature of the fluid supplied by the fluid source. The method includes measuring a temperature variation in the compartment between two instants to obtain a temperature gradient, and detecting a fluid leak when the temperature gradient is greater than or equal to a threshold temperature gradient.

13 Claims, 2 Drawing Sheets

(51) Int. Cl.
| | | |
|---|---|---|
| *F01D 17/08* | (2006.01) | |
| *F02C 6/08* | (2006.01) | |
| *F02C 7/047* | (2006.01) | |
| *G01M 3/00* | (2006.01) | |
| *G01M 3/02* | (2006.01) | |

(52) U.S. Cl.
CPC ............... *F02C 6/08* (2013.01); *F02C 7/047* (2013.01); *G01M 3/002* (2013.01); *G01M 3/025* (2013.01); *F05D 2270/303* (2013.01); *F05D 2270/309* (2013.01); *Y02T 50/672* (2013.01)

(58) Field of Classification Search
CPC .. H02J 1/00; Y02T 10/00; B61D 15/06; F02C 7/047
See application file for complete search history.

(56) References Cited

U.S. PATENT DOCUMENTS

| | | | | | |
|---|---|---|---|---|---|
| 3,769,998 | A * | 11/1973 | Avant | ................... | F16K 31/365 137/116.5 |
| 3,771,350 | A * | 11/1973 | Romans | ................ | G01M 3/002 250/256 |
| 3,981,466 | A * | 9/1976 | Shah | ...................... | B64D 15/02 165/42 |
| 4,006,634 | A * | 2/1977 | Billette | ..................... | G01F 1/42 73/861.53 |
| 4,351,150 | A * | 9/1982 | Schulze | ................ | F01D 17/085 60/226.1 |
| 4,655,607 | A * | 4/1987 | Kern | ...................... | G01M 3/38 250/342 |
| 4,702,273 | A * | 10/1987 | Allen, Jr. | ................. | F02C 7/277 123/179.31 |
| 4,710,095 | A * | 12/1987 | Freberg | ................ | F01D 17/085 374/138 |
| 4,757,963 | A * | 7/1988 | Cole | ..................... | B64D 15/04 244/134 B |
| 4,852,343 | A * | 8/1989 | Norris | .................... | B64D 15/22 60/779 |
| 5,063,963 | A * | 11/1991 | Smith | ...................... | F02C 6/08 137/606 |
| 5,400,984 | A * | 3/1995 | Arnold | .................. | B64D 15/04 244/134 B |
| 5,463,865 | A * | 11/1995 | Smith | ..................... | F01D 17/08 415/118 |
| 5,581,995 | A * | 12/1996 | Lucenko | ................ | F01D 17/02 60/39.091 |
| 6,079,670 | A * | 6/2000 | Porte | ..................... | B64D 15/04 165/170 |
| 6,098,011 | A * | 8/2000 | Scott | ........................ | G05B 9/03 318/564 |
| 6,960,019 | B2 * | 11/2005 | Dammann | ............. | B64D 45/00 250/227.14 |
| 7,588,368 | B2 * | 9/2009 | Hagen | ................. | F02D 41/1445 374/135 |
| 7,725,272 | B2 * | 5/2010 | Ginggen | ........... | A61M 5/14276 219/494 |
| 7,930,928 | B2 * | 4/2011 | Ruston | ...................... | F02C 9/16 73/112.01 |
| 8,061,657 | B2 * | 11/2011 | Rocklin | ................. | B64D 15/04 138/116 |
| 8,100,632 | B2 * | 1/2012 | Chillar | ..................... | F01D 25/12 415/108 |
| 8,291,712 | B2 * | 10/2012 | Ponziani | ................ | F01D 17/02 60/39.24 |
| 8,410,946 | B2 * | 4/2013 | Ansari | .................. | G01M 3/002 340/605 |
| 8,678,319 | B2 * | 3/2014 | Todorovic | .............. | B64D 15/04 244/134 B |
| 8,696,196 | B2 * | 4/2014 | Monteiro | ............... | B64D 13/00 374/183 |
| 8,702,372 | B2 * | 4/2014 | Ansari | .................... | F02C 7/057 415/1 |
| 8,825,278 | B2 * | 9/2014 | Bense | ................ | F16K 37/0083 701/32.9 |
| 8,876,054 | B2 * | 11/2014 | Porte | ...................... | B64D 33/02 244/134 B |
| 8,881,991 | B2 * | 11/2014 | Buhring | ................ | B64D 13/06 137/468 |
| 8,997,558 | B2 * | 4/2015 | Romig | ................. | G01N 1/2252 73/112.01 |
| 9,019,108 | B2 * | 4/2015 | Chillar | .................. | F01K 13/003 340/500 |
| 9,097,182 | B2 * | 8/2015 | Chillar | .................. | F01D 17/085 |
| 9,140,189 | B2 * | 9/2015 | Romig | .................... | F02C 7/232 |
| 9,140,195 | B2 * | 9/2015 | Botarelli | .................... | F02C 9/00 |
| 9,239,008 | B2 * | 1/2016 | Ekanayake | .............. | F02C 7/00 |
| 9,528,880 | B2 * | 12/2016 | Wang | .................. | G01M 15/14 |
| 9,638,086 | B2 * | 5/2017 | Shin | ........................ | F01N 3/208 |
| 9,764,847 | B2 * | 9/2017 | Wright | .................... | B64D 13/08 |
| 9,914,543 | B2 * | 3/2018 | Meis | ..................... | B64D 15/20 |
| 9,933,313 | B2 * | 4/2018 | Agrawal | ............... | G01M 15/14 |
| 10,017,260 | B2 * | 7/2018 | Moscatelli | ............. | B64D 15/06 |
| 2010/0003123 | A1 * | 1/2010 | Smith | ....................... | F02C 3/34 415/116 |
| 2010/0147399 | A1 | 6/2010 | Buhring | | |
| 2010/0158068 | A1 | 6/2010 | Monteiro | | |
| 2012/0048000 | A1 * | 3/2012 | Kirzhner | .................... | F02C 7/22 73/40.5 R |
| 2013/0226395 | A1 | 8/2013 | Bense et al. | | |
| 2013/0340442 | A1 * | 12/2013 | Djebali | ...................... | F01D 17/08 60/786 |
| 2014/0119881 | A1 * | 5/2014 | Kalra | ........................ | F01D 11/04 415/1 |
| 2015/0260501 | A1 * | 9/2015 | Go | ........................ | B64D 15/20 324/671 |

* cited by examiner

METHOD FOR DETECTING A FLUID LEAK IN A TURBOMACHINE AND SYSTEM FOR DISTRIBUTING A FLUID

TECHNICAL FIELD

The invention relates to the field of turbomachines, and particularly to the field of systems for distributing a fluid equipping such turbomachines.

STATE OF PRIOR ART

Systems for distributing especially a pressurized and gaseous fluid in turbomachines generally involve a high number of pipes some of which may be disposed at least partly in sensitive compartments of turbomachines.

Thus, because of the generally high temperature of these pressurized gas fluids, the slightest leak of a pipe in one of these sensitive compartments of the turbomachine can be a problem and damage the turbomachine. This is particularly the case for the Nacelle Anti-Icing (NAI) circuit and the pressurized air supply circuit of the starter, which are partly accommodated in a zone fan compartment radially situated outside the turbomachine fan casing and inside the nacelle.

Indeed, a turbomachine fan, and more particularly the fan compartment, may comprise elements of composite material(s) having a low temperature resistance. However a leak in the fan compartment of the pressurized air passing in the NAI circuit can lead to a strong temperature rise in this compartment which is likely to exceed 350° C. At these temperatures, said elements of composite material(s) can only keep their integrity on a relatively short lapse of time, typically in the order of 15 s.

For these reasons, it is therefore necessary to set up methods for detecting a gas fluid leak, whether at the pipes or at the valves equipping said pipes.

Such methods for detecting a leak are known from documents US2013226395 and US2013340442. Both methods consist in controlling the state of one or more valves of pipes of the system for distributing a fluid especially by monitoring the pressure in the pipes and/or the sensitive compartments.

However, both methods only partially address the problem of monitoring a high temperature gas fluid leak in a sensitive compartment of the turbomachine. Indeed, though these methods enable, for example, the detection of a valve that would remain open and which could potentially generate, through this constant communication, a temperature rise in the sensitive compartment, they are not adapted to detect a leak which could be linked to the breakup or disengagement of a duct from the pipe. Moreover, when the system has several pipes, these methods must be applied to each of the pipes passing in said sensitive compartment.

It is also known from prior art to fit temperature sensors in sensitive compartments. These temperature sensors enable the setup of a fluid monitoring method in these sensitive compartments by detecting any abnormal temperature rise. Such a temperature monitoring therefore allows the detection of an unusual feed of high temperature fluids in the sensitive compartment which can only originate from a high temperature fluid leak.

Thus, such a method for detecting a leak enables the detection of high temperature fluid leaks whatever the origin of these leaks and the number of pipes likely to leak. Nevertheless, as shown in FIG. 1, the used temperature sensors have a certain inertia. Indeed, FIG. 1 is a graph depicting the real temperature 901 in the compartment during a simulated gas fluid leak compared with the temperature 902 measured by the temperature sensor. Thus, whereas the gas fluid leak results in a nearly immediate temperature rise in the compartment (the total temperature increase time is lower than 5 s), the temperature sensor exhibits a much slower temperature rise (in the order of 130-140 s) since this sensor acts on the ambient temperature as a low pass-filter having a high time constant. For example, for a threshold temperature of 120° C., considered as critical for elements of composite material(s) with a low temperature resistance, nearly 15 s are necessary to detect it whereas it is reached in the compartment in less than one second. If we add to this period a latency period of typically 8 s to process the information and for the processing unit of the turbomachine to close the valves of the pipe of the fluid distribution system, it results that the elements of composite material(s) are submitted to this critical temperature during a time of nearly 23 s. Since this time should not ideally exceed 15 s to maintain the integrity of the elements of composite material(s), it is necessary to reduce the detection time, for example to less than 7 s if the latency period is 8 s.

This problem is particularly present for the system for distributing a fluid, in particular gas fluid, which comprises the high temperature pressurized air supply pipe of both the aircraft and the starter of the turbomachine and the air supply pipe of the NAI circuit. Indeed, these pipes have ducts which are particularly accommodated in the fan compartment of the turbomachine, especially to supply the starter and the anti-icing circuit of the air inlet scoop with pressurized air. However, as already indicated, the fan compartment is particularly sensitive due to the elements of composite material(s) it contains. It is therefore important that such a system for distributing high temperature pressurized air should enable the detection of the high temperature air leaks in the fan compartment.

DISCLOSURE OF THE INVENTION

The object of the invention is to overcome this drawback and the aim thereof is therefore to provide a method for detecting a high temperature fluid leak in a turbomachine which would enable detecting a high temperature fluid leak in a turbomachine compartment whatever the origin of the leak, and this with a reduced detection time compared with prior art.

To this end, the invention relates to a method for detecting a gas fluid leak in a aircraft turbomachine, said turbomachine comprising:
  a high temperature gas fluid source,
  at least one gas fluid distribution pipe adapted to distribute said gas fluid to different parts of the turbomachine and/or the aircraft,
  a turbomachine compartment in which the distribution pipe is at least partly accommodated, said compartment containing air which has in operation a temperature and a pressure respectively lower to the temperature and the pressure of the gas fluid,
  the method comprising the following steps:
  measuring a temperature variation of the air in at least one location in the compartment between two instants to obtain a temperature gradient,
  detecting a gas fluid leak in the compartment if the temperature gradient is greater than or equal to a threshold temperature gradient. Such a method makes it possible to detect a high temperature gas fluid leak in the compartment within a much lower time than that of a simple detection by temperature threshold. Indeed, the gas fluid feed in the compartment during a leak generally generates, as illustrated in FIG. 1, a temperature rise in the compartment which is nearly immediate and which has a direct impact on the measured temperature. The measured temperature variation, and therefore also the measured temperature gradient, are important from the first instants of the leak of the gas fluid.

Thus, this detection method makes it possible to detect the appearance of a high temperature gas fluid leak in the compartment with a detection time close to ten times lower than that of a prior art method enabling the detection of a gas fluid leak whatever its origin.

It is meant, above and in the rest of the document, by low temperature relative to the high temperature that the temperature difference between the high temperature gas fluid supplied by the gas fluid source and the temperature prevailing in the compartment is greater than 50° C. and preferably than 100° C. So, the air of the compartment haves a temperature inferior to the one of the gas fluid, which temperature of the air of the compartment could be identified as low relatively to the high temperature of the gas fluid.

Similarly, the step of detecting a leak is preferably a step for detecting a gas fluid leak if the temperature gradient is strictly greater than a threshold temperature gradient.

The method may further comprise the following steps:
measuring a temperature of the air in one location in the compartment,
detecting a gas fluid leak if the temperature measured is greater than or equal to a threshold temperature.

Such complementary detection steps are particularly adapted for detecting a low intensity high temperature gas fluid leak which leads to a contained temperature increase.

Measuring a temperature variation can be carried out in at least two locations of the compartment so as to obtain at least two temperature gradients, the fluid leak detection thus occurring if at least one of both temperature gradients is greater than the threshold temperature gradient.

Such a detection provided by means of redundant sensors enables a reliable detection whatever the location of the gas fluid leak in the compartment.

The method can comprise a further step of:
inhibiting the step of detecting a leak when the turbomachine is in a predetermined state in which the temperature gradient is greater than or equal to a threshold temperature gradient.

The method can comprise a further step of:
modifying the threshold temperature gradient as a function of the turbomachine state.

Such steps of inhibiting and modifying the threshold temperature gradient enable erroneous detections of fluid leaks to be avoided, which could be due to some extreme operating configurations of the turbomachines such as the start.

The method can comprise a further step of:
closing the gas fluid pipe upstream the compartment if a leak is detected.

The compartment can be radially situated between a fan casing and a turbomachine nacelle.

The at least one location in which the air temperature gradient is measured could be a location set at a distance of the at least gas fluid pipe comprises between half an exterior diameter of the gas fluid pipe and four times of the exterior diameter of the gas fluid pipe.

by location relatively at distance, it had to be understood that it is set at a certain distance between the air temperature variation measurement location and the exterior surface of the at least one gas fluid distribution pipe, to allow the supply of a temperature variation measurement which is little disturb by the at least one canalisation in normal operation, which means without gas fluid leak. In particular, if the temperature sensor is as the measurement location coincide with the sensor location, the sensor case will be set so as to not be in contact with the exterior surface of the at least one gas fluid pipe. In normal operation, the possible gas fluid temperature fluctuations in the at least one fluid pipe does not imply significant variation of the air temperature at the measurement location.

Nevertheless, in case of gas fluid leak in the compartment, the air temperature variation at the measurement location is significantly sufficient in order that the temperature gradient exceeds the temperature gradient threshold. Such arrangement allow a detection more responsive, relatively to a measurement location which would set on the exterior surface of a gas fluid pipe, in which case the temperature gradient threshold has to be significantly higher and would lead to a detection less responsive.

In other words, the air temperature variation measurement location is preferably set to supply an air temperature variation measurement which no real thermal disturbance caused by the pipe when there is no leakage on the pipe.

More precisely, the air temperature variation measurement location is set at a distance from the exterior of the pipe which is comprise between half the exterior diameter of the pipe and four times the exterior diameter of the pipe. Preferably, at least one temperature variation measurement location is set at distance from the pipe superior or equal two times the exterior diameter of the pipe.

More preferably, the air temperature variation measurement location could be set directly facing the pipe, i.e. there is no obstacle between the air temperature variation measurement location and the pipe. So, in the case of a crack on the pipe near the measurement location, the detection of an air temperature variation abnormal is fast enough even of the leakage rate is low.

The air temperature variation measurement location could be measured is at the surface of a thermal isolated layer disposed on the at least one gas fluid pipe.

The temperature sensor used for the air temperature variation measurement location is mounted on the pipe while relatively no real thermal disturbance caused by the pipe when there is no leakage on the pipe. The extend of the thermal isolated layer on the pipe is sufficient reduce so that in case of a break of the pipe under the thermal isolated layer, the high temperature gas fluid leakage makes a fast increasing to the air temperature at the sensor location.

The air temperature gradient measurement could be obtained by the means of a temperature sensor of the variable resistor type.

The turbomachine can comprise a first and a second gas fluid pipes, the high temperature gas fluid source being a turbomachine compressor supplying high temperature air as a gas fluid, the first gas fluid pipe being a pipe able to distribute said high temperature air to the aircraft and to a starter of the turbomachine, the second gas fluid pipe being a pipe a pipe able to distribute the high temperature air at an air inlet scoop of the turbomachine, the first and the second pipes being at least partly accommodated in the compartment.

The method according to the invention is particularly adapted for the detection of fluid leak in such compartments which comprises several gas fluid pipes.

The invention also relates to a system for distributing a high temperature fluid for an aircraft turbomachine, comprising:
- a high temperature gas fluid source,
- at least one fluid distribution pipe adapted to distribute said gas fluid to different parts of the turbomachine and/or the aircraft,
- a turbomachine compartment in which the distribution pipe is at least partly accommodated, said compartment containing air which has in operation a temperature and a pressure respectively inferior to a temperature and a pressure of the gas fluid,
- at least one temperature sensor of the turbomachine compartment,
- a processing unit arranged to control the at least one temperature sensor and configured to detect a fluid leak in the compartment,
- the processing unit being configured to supply from the at least one temperature sensor, a measurement of a temperature variation of the air at least a location in the compartment between two instants in order to deduce therefrom a temperature gradient, and to detect a gas fluid leak if the temperature gradient is greater than and/or equal to a threshold temperature gradient.

Such a system enables the implementation of a method according to the invention and thus enables to benefit of the advantages related to the method according to the invention.

The turbomachine compartment could be radially situated between a fan casing and a nacelle of the turbomachine.

The system for distributing a fluid can comprise a first and a second gas fluid pipes, the high temperature gas fluid source being a turbomachine compressor supplying high temperature air as a gas fluid, the first gas fluid pipe being a pipe able to distribute said high temperature air to the aircraft and to a starter of the turbomachine, the second gas fluid pipe being a pipe a pipe able to distribute the high temperature air at an air inlet scoop of the turbomachine, the first and the second pipes being at least partly accommodated in the compartment.

a first and a second temperature sensor can be fitted in the turbomachine compartment on either side of the turbomachine fan.

Preferably, the first temperature sensor is set at a distance from the first pipe superior or equal to half the exterior diameter of the first pipe, and the second temperature sensor is set at a distance from the second pipe superior or equal to half the exterior diameter of the second pipe. More preferably, the distance between the first temperature sensor and the first gas fluid pipe is inferior or equal to four times the exterior diameter of the first gas fluid pipe, and wherein the distance between the second temperature sensor and the second gas fluid pipe is inferior or equal to four times the exterior diameter of the second gas fluid pipe.

Such location of the first and second sensor are profitable for reducing the times for detecting a gas fluid leak that would occur on one of the first and the second pipe.

The invention further relates to an aircraft turbomachine comprising a system for distributing a fluid according to the invention.

Such a turbomachine benefits from the advantages related to the method according to the invention.

BRIEF DESCRIPTION OF DRAWINGS

The present invention will be better understood upon reading the description of exemplary embodiments, given for information purposes only and in no way limiting, with reference to the appended drawings in which.

The different parts represented in the figures are not necessarily drawn to a uniform scale, in order to make the figures more understandable.

The different possibilities (alternatives and embodiments) must be understood as being not exclusive from one another and can be combined to each other.

DETAILED DISCLOSURE OF PARTICULAR EMBODIMENTS

Figure 2:
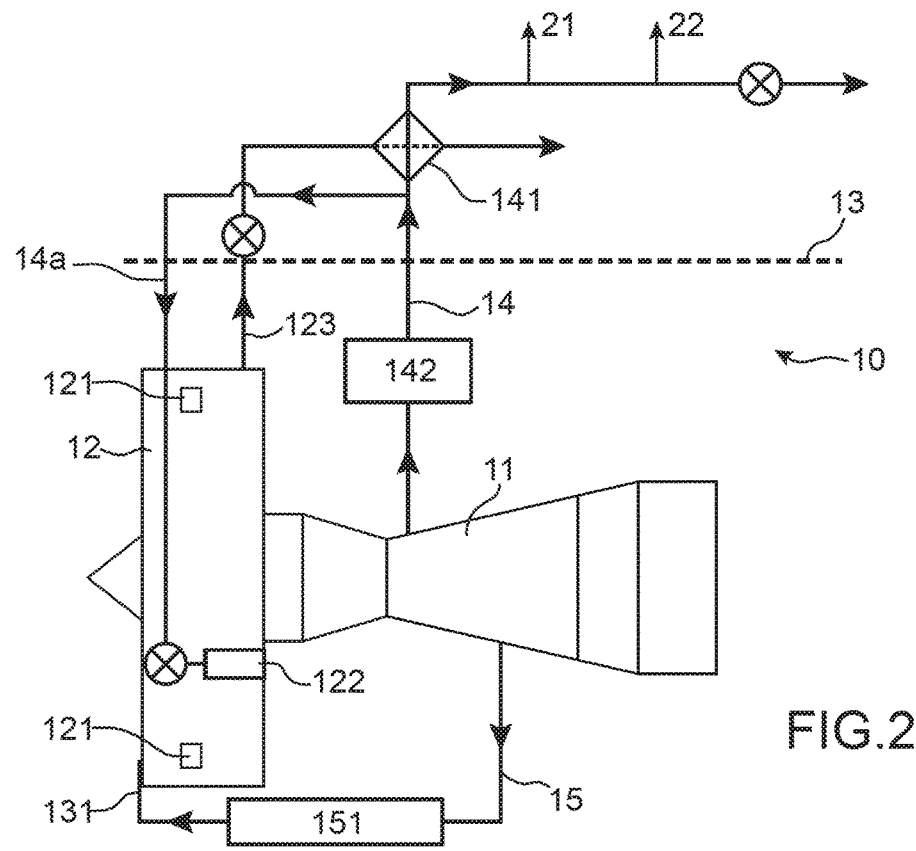

FIG. 2 schematically shows an exemplary system for distributing a fluid, more precisely pressurized air, according to the invention equipping a turbomachine 10.

Such a system for distributing a fluid comprises:
- a high pressure compressor 11 forming a high temperature pressurized air source,
- a fan 12 having a casing which externally delimits a secondary flow stream and outside which a first and a second temperature sensors 121 are fitted to measure the temperature in the fan compartment,
- a turbomachine nacelle 13 comprising an inlet scoop 131 of the turbomachine for the air intake in the latter,
- a first high pressure pipe 14 to draw out high temperature pressurized air from the high pressure compressor to the aircraft, said first pipe comprising a secondary branch 14a to supply a turbomachine starter 122 with pressurized air,
- a second pipe 15 for the nacelle anti-icing 13 and the turbomachine 10 inlet scoop 131,
- an engine computer, not shown.

The turbomachine fan 12 generally comprises high temperature sensitive elements of composite material(s). The fan 12 is therefore a sensitive compartment of the turbomachine in which it is important to detect a possible high temperature gas fluid leak, such as pressurized air supplied by the high pressure compressor 11.

The high pressure compressor 11 enables the first and the second pipes 14, 15 to be supplied with high temperature pressurized air that can typically reach 500° C.

The first pipe 14 is arranged to draw out pressurized air from the high pressure compressor in order to supply the aircraft with pressurized air especially for the aircraft air conditioning 21 and wing anti-icing 22 systems.

Upstream a heat exchanger 141 enabling pressurized air to be cooled from the air drawn out in the fan (from the pipe referenced 123 in FIG. 2), the first pipe 14 comprises a secondary pipe 14a towards the starter 122. Thus, the first pipe 14 enables the starter 122 located in the fan 12 to be supplied with pressurized air the temperature of which is typically in the order of 360° C.

The first pipe 14 comprises first valves 142, typically so-called ECS valves (Environmental Control System) to regulate air flows drawn off from the high pressure compressor 11.

The second pipe 15 enables the air inlet scoop 131 anti-icing circuit of the nacelle 13 to be supplied. The second pipe 15 comprises second valves 151 to regulate the air flow drawn out from the high pressure compressor 11. Typically, the second pipe 15 enables the air inlet scoop 131 anti-icing circuit to be supplied with pressurized air with a temperature in the order of 500° C.

Whether it is the first or the second pipe 14, 15, both passing in the fan 12, part of their respective ducts are accommodated in the fan compartment. Thus, in case of a leak of one of these ducts in the fan compartment, this generates a high temperature pressurized air feed and therefore a temperature rise in the compartment. Such a temperature rise is detrimental to certain elements of composite material(s) that can be in the fan compartment.

In order to enable the detection of such leaks, the fan compartment comprises first and second temperature sensors 121 which are arranged on either side of the compartment, for example diametrically opposed with respect to the fan casing 12, in order to detect any temperature rise which would result from a hot air leak in the fan compartment. The first and second temperature sensors 121 are in communication with the engine computer. These first and second temperature sensors 121 can be, for example, variable resistance type sensors (or Variable Resistance Transducer, VRT). Advantageously, the temperature measured by each sensor is derived and then filtered with a second order low-pass filter, in order to eliminate any noise on the measurement of the temperature gradient due to the derivation operation without attenuating this same gradient measurement too much.

The first and the second temperature sensor 121 are both set at a distance from respectively the first and the second pipe 14, 15 I such manner to allow an air temperature measure, and so an air temperature variation at an location of the compartment which is at distance from the first and second canalisation 14, 15.

In this way, the air temperature variations measurements are supplied by the means of the first and second temperature sensor 121 which are as much as possible no real thermal disturbance caused by the pipe when there is no leakage on the pipe.

To enable a pressurized air leak to be detected in the fan 12, the engine computer is configured to implement a method comprising the following steps:

measuring a first and a second temperatures in the fan compartment from the first and second temperature sensors 121, said measurements being compared with a measurement made at a previous instant in order to determine for each a temperature variation between two instants and to obtain for each a temperature gradient, detecting a fluid leak if at least one of both temperature gradients is greater than or equal to a threshold temperature gradient or if one of both temperatures in the compartment is greater than or equal to a threshold temperature.

Figure 1:
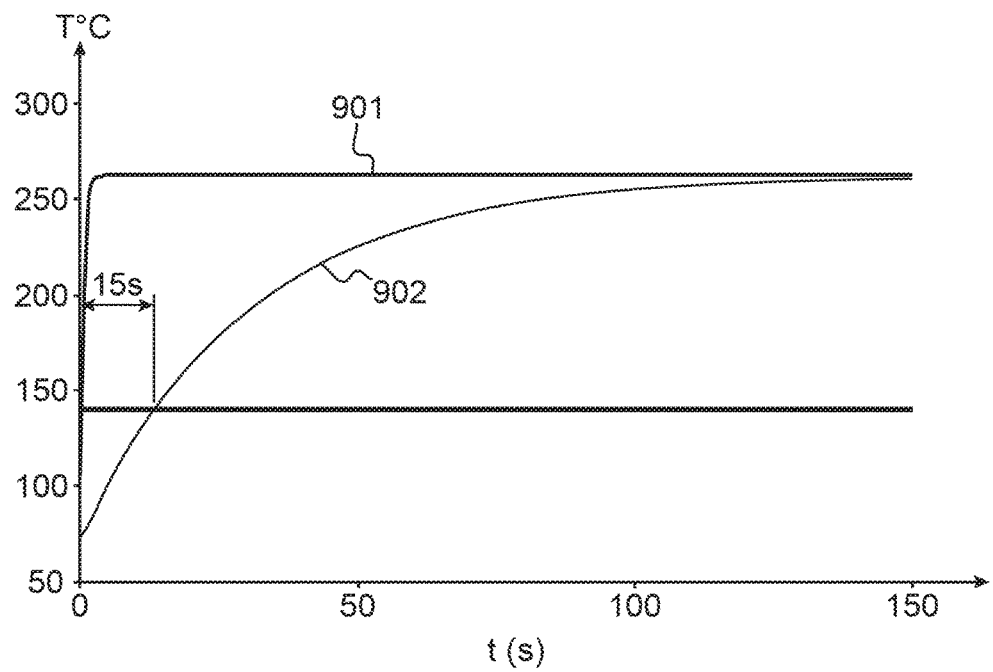
FIG. 1 is a graph depicting the temperature variation in the fan of a turbomachine during a high temperature pressurized air leak compared to the temperature measured by a temperature sensor of the same fan, FIG. 2 schematically shows a turbomachine gas fluid distribution circuit, FIG. 3 respectively depicts a graph representing a temperature gradient variation in the turbomachine fan during a high temperature gas fluid leak and a graph representing the temperature gradient variation measured by a temperature sensor of the same fan during this same leak.

With such a configuration, a gas fluid leak is detected according to two different principles. The first principle, depicted in FIG. 1, is similar to the previously described configuration of prior art engine computers, and consists in directly detecting the temperature rise and the exceeding of a threshold temperature, typically 120° C. This first measuring principle is, within the scope of the invention, mainly dedicated to small pressurized air leaks which result in a slower temperature increase.

Figure 3:
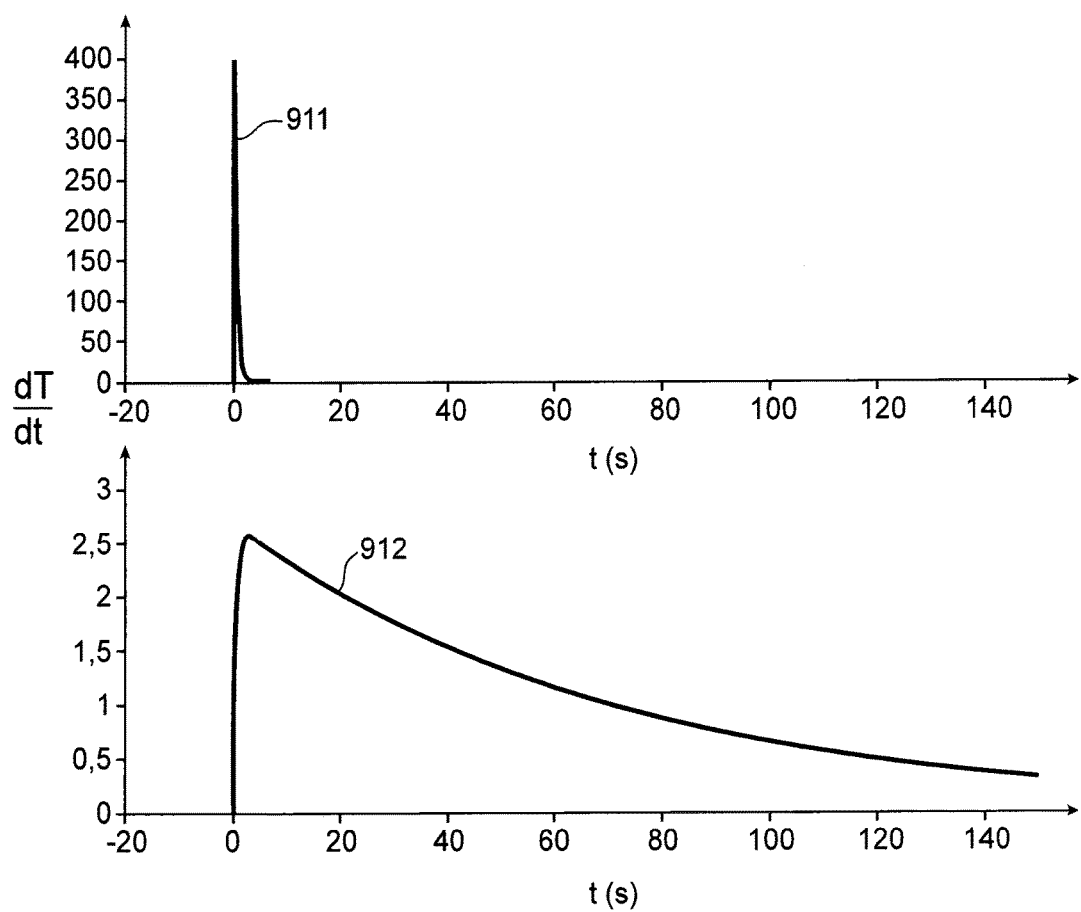

The second detection principle is depicted in FIG. 3. It consists in detecting a strong increase in a temperature gradient that would be related to an important feed of high temperature pressurized air due to a sudden leak of a duct of the first or second pipe 14 15, typically caused by a sudden breakup or a disengagement of one of both pipes. Thus, FIG. 3 depicts in parallel the variation 911 of the real temperature gradient dT(t)/dt in the fan compartment with the variation 912 of the temperature gradient measured by one of the temperature sensors 121. It can thus be seen that when a duct starts to leak, the real and measured temperature gradients exhibit a nearly immediate increase, these being only differentiated by the intensity of this increase. This strong increase is followed, for the real temperature gradient, by a drop as abrupt as the previous increase, whereas the drop is much slower for the measured temperature gradient. Thus, the second detection principle consists in checking that the temperature gradient does not exceed a threshold gradient characteristic of the sudden temperature increase which directly follows the breakup or disengagement of a pressurized air duct.

This second principle therefore enables, for a quick temperature increase in the fan, which is typically the case during a breakup or disengagement of a duct of one of the first and second pipes 14, 15, a detection time much lower than the 15 s necessary according to the first principle and the prior art configuration.

The engine computer is also configured to, when a pressurized air leak is detected, close the pipes likely to be responsible. In addition to closing the first and second valves, the engine computer can also be configured to transmit an error code to the aircraft so as to indicate that a failure has just occurred.

According to another possibility of the invention, the engine computer can be configured to inhibit the step of detecting a leak when the turbomachine is in predetermined state in which the temperature gradient is likely to be greater than or equal to the threshold temperature. This predetermined state can for example be a step of starting the engine.

According to an alternative to this possibility of the invention, the engine computer can be configured to modify the value of the threshold temperature gradient in order to adapt it as a function of the turbomachine state. Thus, for example, the engine computer can be configured to increase the value of the threshold temperature gradient during the start of the turbomachine.

With such a configuration, the engine computer forms a processing unit configured to provide, from the temperature sensors 121, a temperature variation measurement in the fan 12 between two instants in order to deduce therefrom a temperature gradient, and to detect a gas fluid leak if the temperature gradient is greater than and/or equal to the threshold temperature gradient. According to a preferred alternative of the invention, the engine computer can be configured to detect a gas fluid leak if the temperature gradient is strictly greater than a threshold temperature gradient.

It should be noted that, in the above embodiment, the computer is adapted to implement both described detection principles, but it can also be configured to carry out a leak detection according to the second described principle, that is by detecting if a temperature gradient is greater than or equal to a threshold temperature gradient, without carrying out a detection according to the first principle. According to this same possibility, the engine computer can also be configured, in addition, to detect a pressurized air leak according to a third non-described principle, such as those described in documents US2013226395 and US2013340442.

It should be noted that, though in the above described embodiment, the method for detecting a leak enables a detection of a pressurized air leak in the turbomachine fan compartment, it can be adapted to detect a leak in another sensitive compartment of the turbomachine.

It should also be noted that, though in the above described embodiment, the distribution system is a system for distributing pressurized air in the turbomachine, the invention can be adapted to detect a high temperature fluid leak other than the pressurized air leaks without departing from the scope of the invention. Thus, the invention apply to the detection of a gas fluid leak induces by a breaking of a drawn out duct a high temperature oil distribution circuit without departing from the scope of the invention.

The invention claimed is:

1. A method for detecting a fluid leak in an aircraft turbomachine, the turbomachine including:
    a high temperature gas fluid source which provides high temperature gas fluid, a temperature of the high gas fluid being greater than 350° C.,
    at least one gas fluid distribution pipe adapted to distribute the gas fluid to different parts of the turbomachine and/or an aircraft which is to be equipped with the turbomachine, and
    a turbomachine compartment in which the distribution pipe is at least partly accommodated, the compartment containing air which has in operation a temperature lower to the temperature of the gas fluid, the air of the compartment also having a pressure lower than a pressure of the gas fluid, the turbomachine compartment including a temperature sensor in at least one location outside the at least one gas fluid distribution pipe and remote from the at least one gas fluid distribution pipe, the turbomachine compartment being radially situated between a fan casing and a nacelle of the turbomachine,
    the method comprising:
    measuring, using the temperature sensor, a temporal temperature variation of the air in the at least one location in the compartment between two temporal instants to obtain a temperature gradient;
    detecting, using processing circuitry, a gas fluid leak in the compartment when the temperature gradient is greater than or equal to a threshold temperature gradient; and closing the at least one gas fluid pine upstream the compartment when the gas fluid leak is detected.

2. The method for detecting a leak according to claim 1, further comprising:
    measuring a temperature of the air in the at least one location in the compartment; and
    also detecting the gas fluid leak when the measured temperature is greater than or equal to a threshold temperature.

3. The method for detecting a leak according to claim 1, wherein measuring the temperature variation is carried out in at least two locations in the compartment so as to obtain at least two temperature gradients, and
    detecting the gas fluid leak thus occurring when at least one of both temperature gradients is greater than the threshold temperature gradient.

4. The method for detecting a leak according to claim 1, further comprising:
    inhibiting the detecting of the gas fluid leak when the turbomachine is in a predetermined state in which the temperature gradient is greater than or equal to the threshold temperature gradient.

5. The method for detecting a leak according to claim 1, further comprising:
    modifying the threshold temperature gradient as a function of the turbomachine state.

6. The method for detecting a leak according to claim 1, wherein the at least one location in which the air temperature gradient is measured is a location set at a distance of the at least one gas fluid pipe comprises between half an exterior diameter of the at least one gas fluid pipe and four times of the exterior diameter of the at least one gas fluid pipe.

7. The method for detecting a leak according to claim 1, wherein the at least one location in which the air temperature gradient is measured is at the surface of a thermal isolated layer disposed on the at least one gas fluid pipe.

8. The method for detecting a leak according to claim 1, wherein the temperature variation of the air measurement is obtained by the temperature sensor which is a temperature sensor of the variable resistance type.

9. The method for detecting a leak according to claim 1, wherein the turbomachine comprises a first and a second gas fluid pipes, the high temperature gas fluid source being a turbomachine compressor supplying high temperature air as a gas fluid, the first gas fluid pipe being a pipe configured to distribute said high temperature air to the aircraft and to a starter of the turbomachine, the second gas fluid pipe being a pipe configured to distribute the high temperature air at an air inlet scoop of the turbomachine, the first and the second pipes being at least partly accommodated in the compartment.

10. The method for detecting a leak according to claim 9, wherein a first air temperature variation measurement location is set at a distance of the first gas fluid pipe greater or equal to half of an exterior diameter of the first gas fluid pipe, and a second air temperature variation measurement location is set at a distance of the second gas fluid pipe greater or equal to half of an exterior diameter of the second gas fluid pipe.

11. The method for detecting a leak according to claim 10, wherein the distance between the first air temperature variation measurement location and the first gas fluid pipe is inferior or equal to four times the exterior diameter of the first gas fluid pipe, and wherein the distance between the second air temperature variation measurement location and the second gas fluid pipe is inferior or equal to four times the exterior diameter of the second gas fluid pipe.

12. A system for distributing a high temperature gas fluid for an aircraft turbomachine adapted to detect a fluid leak of the high temperature gas fluid in a turbomachine compartment of the aircraft turbomachine, the system comprising:
    a high temperature gas fluid source which provides high temperature gas fluid, a temperature of the high gas fluid being greater than 350° C.;
    at least one fluid distribution pipe adapted to distribute the gas fluid to different parts of the turbomachine and/or the aircraft;
    the turbomachine compartment in which the distribution pipe is at least partly accommodated, said compartment containing air which has in operation a temperature lower to a temperature the gas fluid, the air of the compartment also having in operation a pressure lower than a pressure of the gas fluid, the turbomachine compartment being radially situated between a fan casino and a nacelle of the turbomachine;
    at least one temperature sensor of the turbomachine compartment in at least one location outside the at least one gas fluid distribution pipe and remote from the at least one gas fluid distribution pipe;

a dosing valve of the one fluid distribution pipe upstream to the compartment; and processing circuitry arranged to control the at least one temperature sensor and configured to detect a gas fluid leak in the compartment, wherein the processing circuitry is configured to supply, from the at least one temperature sensor, a measurement of a temporal temperature variation of the air at at least one location in the compartment between two temporal instants in order to deduce therefrom a temperature gradient, and to detect the gas fluid leak when the temperature gradient is greater than and/or equal to a threshold temperature gradient, and wherein the processing circuitry is further configured to close the closing valve when the gas fluid leak is detected in order to close the at least one gas fluid pipe upstream the compartment.

13. The system for distributing a fluid according to claim 12, wherein two temperature sensors are fitted in the turbomachine compartment on either side of the fan casing of the turbomachine.

* * * * *